(12) United States Patent
Goody

(10) Patent No.: US 8,963,004 B2
(45) Date of Patent: Feb. 24, 2015

(54) EXTRUDED FRAME STRUCTURES TO HOUSE A CONDUCTOR

(75) Inventor: Ray Goody, Gresham, OR (US)

(73) Assignee: SAPA Extrusions, Inc., Rosemont, IL (US)

(*) Notice: Subject to any disclaimer, the term of this patent is extended or adjusted under 35 U.S.C. 154(b) by 1177 days.

(21) Appl. No.: 12/725,364

(22) Filed: Mar. 16, 2010

(65) Prior Publication Data

US 2010/0230162 A1 Sep. 16, 2010

Related U.S. Application Data

(60) Provisional application No. 61/160,586, filed on Mar. 16, 2009.

(51) Int. Cl.
 H01B 7/00 (2006.01)
 B21C 23/22 (2006.01)
 B21C 23/14 (2006.01)
 H02G 5/02 (2006.01)
 H02G 3/04 (2006.01)
 H03G 3/18 (2006.01)

(52) U.S. Cl.
 CPC ............... B21C 23/22 (2013.01); B21C 23/14 (2013.01); H02G 5/025 (2013.01)

USPC ........ 174/72 A; 174/68.1; 174/68.3; 174/657; 174/667

(58) Field of Classification Search
 USPC ......... 174/72 A, 69.1, 68.2, 68.3, 72 B, 72 C, 174/71 B, 656, 657, 658, 667, 68.1; 136/244, 251
 See application file for complete search history.

(56) References Cited

U.S. PATENT DOCUMENTS

| | | | | | |
|---|---|---|---|---|---|
| 4,276,332 | A | * | 6/1981 | Castle | 428/34.1 |
| 5,571,338 | A | * | 11/1996 | Kadonome et al. | 136/251 |
| 7,804,032 | B2 | * | 9/2010 | Wilker et al. | 174/480 |
| 8,294,030 | B2 | * | 10/2012 | Pollard, Jr. | 174/155 |
| 2008/0087275 | A1 | * | 4/2008 | Sade et al. | 126/623 |

OTHER PUBLICATIONS

Azon, "Aluminum Thermal Barrier Windows," article, 2004, pp. 1-4.

* cited by examiner

Primary Examiner — Hoa C Nguyen
Assistant Examiner — Binh Tran
(74) Attorney, Agent, or Firm — Loeb & Loeb LLP (57) ABSTRACT

Embodiments of the present disclosure provide extruded frame structures to house a conductor and associated techniques and configurations. An apparatus includes an extruded frame structure having a frame profile configured to house a conductor and insulator. Other embodiments may be described and/or claimed.

10 Claims, 7 Drawing Sheets

EXTRUDED FRAME STRUCTURES TO HOUSE A CONDUCTOR

CROSS REFERENCE TO RELATED APPLICATIONS

The present application claims priority to U.S. Provisional Patent Application No. 61/160,586, filed Mar. 16, 2009, the entire specification of which is hereby incorporated by reference in its entirety for all purposes, except for those sections, if any, that are inconsistent with this specification.

TECHNICAL FIELD

Embodiments of the present invention relate to extruded frame structures, and in particular to extruded frame structures to house a conductor and associated systems and methods of fabrication.

BACKGROUND

Current systems that use or generate electricity including, for example, solar energy systems, generally include structural members to provide a support framework for solar/electrical devices (e.g., solar cells/panels) and conventional wiring to couple the solar/electrical devices with equipment to convert the energy for use in a power grid. Such systems may include cumbersome or unsightly conventional wires or cables for transfer of electrical energy. Such conventional wiring may be exposed and/or otherwise prone to elements, rodents, human accident, or other forces that readily compromise the wiring. Current systems generally require significant cost and time to install because securing the solar panels to a framework and electrically coupling the solar panels for the transfer of energy are generally disparate actions. Such systems may also fail to simultaneously provide structural support and convenient access to an electrical pathway for transfer of electrical energy.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS

In the following detailed description, reference is made to the accompanying figures which form a part hereof wherein like numerals may designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)", that is, A is an optional element.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the phrases "in an embodiment," or "in various embodiments," which may each refer to one or more of the same or different embodiments. Furthermore, the terms "comprising," "including," "having," and the like, as used with respect to embodiments of the present invention, are synonymous.

Figure 1:
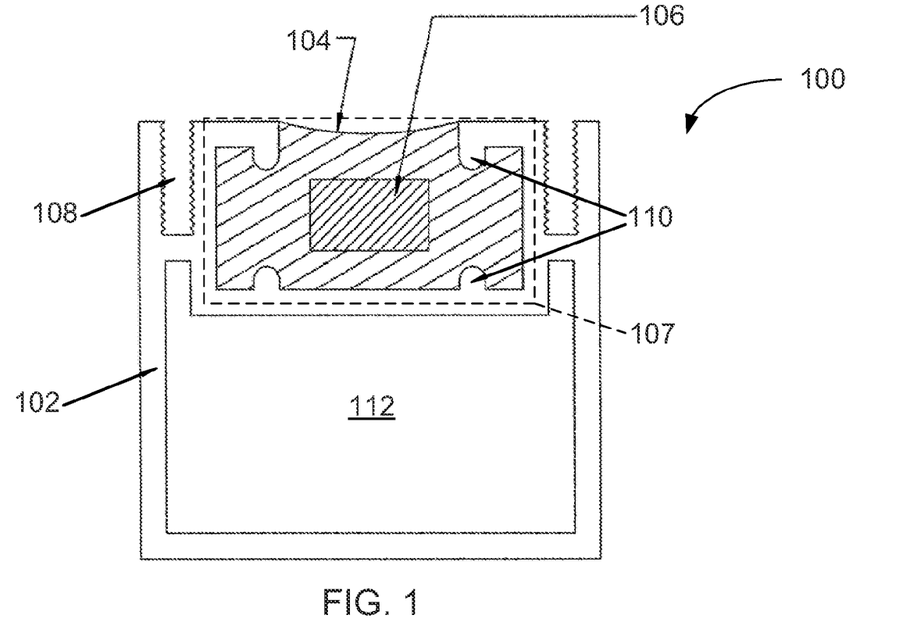
FIG. 1 is a cross-section schematic diagram of an extruded frame structure, in accordance with various embodiments of the invention.

FIG. 1 is a cross-section schematic diagram of an extruded frame structure 100, in accordance with various embodiments of the invention. In various embodiments, the extruded frame structure 100 comprises a frame profile 102 having an insulator 104 and conductor 106 disposed in a region 107 of the frame profile 102, as shown. The frame profile 102 represents a cross-section shape/configuration of the extruded frame structure 100, as shown. The region 107 may be configured to house the insulator 104 and the conductor 106. In an embodiment, the region 107 of the frame profile 102 is configured to substantially surround the conductor 106 and the insulator, except for an area where the insulator 104 is exposed, as illustrated.

The extruded frame structure 100 may include any of a variety of materials. In an embodiment, the extruded frame structure 100 is a metal or alloy including, for example, aluminum. The extruded frame structure 100 can include other metals such as roll-formed steel or extrudable polymers. Subject matter is not limited in this regard and the extruded frame structure 100 may include a variety of other materials that provide desirable characteristics. For example, the extruded frame structure 100 may provide sufficient rigidity to structurally support one or more electrical devices such as solar panels or to protect the conductor 106 disposed therein.

The extruded frame structure 100 is formed by an extrusion process. The extruded frame structure 100 may have a substantially fixed or uniform cross-sectional frame profile 102 according to various embodiments. For example, the frame profile 102 may have a substantially constant shape in a lengthwise direction in and out of the page.

The frame profile 102 includes a variety of features. In an embodiment, the frame profile 102 includes one or more couplers 108 to facilitate coupling of the extruded frame structure 100 to other structures and/or devices. For example, the one or more couplers 108 may include threaded regions or other type of connector to facilitate coupling (e.g., by fasteners or other means) of one or more devices that generate and/or use electrical energy (e.g., solar panels) to the extruded frame structure 100.

The one or more couplers 108 may be positioned to facilitate coupling of a device that generates and/or uses electrical energy to the conductor 106. In an embodiment, the one or more couplers 108 include one or more recessed regions, as shown. The one or more couplers 108 (e.g., one or more recessed regions) can be, for example, disposed in a surface of the frame profile 102 adjacent to the area where the insulator 104 is exposed, as shown. In an embodiment, the one or more couplers 108 are configured to couple one or more solar devices such as, for example, a solar panel to the extruded frame structure 100. Subject matter is not limited in this regard and the one or more couplers 108 may be used to couple other structures and/or devices to the extruded frame structure 100 in other embodiments.

The frame profile 102 may further include one or more grip structures 110. The one or more grip structures 110 are disposed in the region 107 of the frame profile 102 to facilitate holding the insulator 104 and the conductor within the region 107 or to prevent the insulator 104 and the conductor 106 embedded in the insulator 104 from being removed or separated from the extruded frame structure 100. In an embodiment, the frame profile 102 includes at least four grip structures 110 where at least two of the grip structures are disposed opposite to each other, as illustrated. The one or more grip structures 110 may include other shapes or configurations than depicted.

The frame profile 102 may be extruded according to a variety of shapes and sizes. Although the illustrated embodiment in FIG. 1 depicts a particular shape and configuration, other shapes or configurations in accordance with embodiments described herein are envisioned and fall within the scope of this description. For example, the frame profile 102 may include curves, non-rectilinear shapes, amorphous shapes, or other shapes or configurations in other embodiments. Some embodiments depicting other example shapes and/or configurations are further described in connection with FIGS. 3-7.

In an embodiment, the frame profile 102 includes an area 112 void of extrusion material. The area 112 may be a region that is left hollow or otherwise unoccupied with extrusion material during extrusion of frame profile 102, for example, to preserve waste of extrusion materials associated with forming the frame profile 102. The area 112 may be occupied with air, for example, according to one embodiment. One or more structural features (e.g., structures of the frame profile 102 that surround area 112) can be used to couple the extruded frame structure with additional structural members (e.g., using connector 217 of FIG. 2)

The extruded frame structure 100 may further include an insulator 104 and conductor 106, coupled as shown. The insulator 104 may include any of a variety of materials that provide sufficient electrical insulation for the conductor 106. In an embodiment, the insulator 104 comprises a material having a dielectric constant between, e.g., about 3 to about 3.5 at 1 megahertz (MHz). Subject matter is not limited in this regard, and the insulator 104 may include other suitable electrically insulative materials having other suitable dielectric or insulative properties in other embodiments.

The insulator 104 may comprise a material that flows to substantially fill the region of the frame profile 102, as depicted, and then hardens to prevent flow of the insulator 104 away from the frame profile 102. In an embodiment, the insulator 104 includes a polymer comprising a hardener and resin. For example, the insulator 104 can include polymeric diphenylmethane diisocyanate, ethylene glycol, diethylene glycol, or di(ethylene glycol) phthalate, variants thereof, or suitable combinations thereof. In an embodiment, the insulator 104 includes urethane (e.g., polyurethane). Subject matter is not limited in this regard and the insulator 104 may include a variety of other electrically insulative materials amenable to fabrication according to embodiments described herein. The insulator 104 may be deposited using any suitable method well-known in the art, including, for example, pouring, roll forming, pressing, or injection molding. Other deposition techniques may be used in other embodiments.

In various embodiments, the conductor 106 may be embedded and electrically insulated within the insulator 104, as shown. The conductor 106 may be safely disposed within the region 107 of the frame profile 102 configured to house the insulator 104 and the conductor 106 while providing convenient electrical access to the conductor 106 through an opening at the top of the frame profile 102 (e.g., area where the insulator 104 is exposed).

The conductor 106 may be placed or formed within the insulator 104, either prior to the insertion, during insertion, or after insertion of insulator material to form the insulator 104, according to various embodiments. The conductor 106 comprises an electrically conductive material. In an embodiment, the conductor 106 comprises a metal or alloy including, for example, copper (Cu) or aluminum (Al). Subject matter is not limited in this regard, and the conductor 106 may include a variety of other electrically conductive materials in other embodiments.

In an embodiment, the conductor 106 is a buss bar. In another embodiment, the conductor 106 is a wire. The conductor 106 may be simultaneously extruded with the frame profile 102 according to various embodiments. In other embodiments, the conductor 106 is formed independent of the frame profile 102. Such techniques are further described in connection with FIGS. 7-8.

The conductor 106 may be disposed in the extruded frame structure 100 to provide convenient access to an electrical power grid for a device (e.g., solar/electrical device 260 of FIG. 2) when the device is coupled with the extruded frame structure 100. The conductor 106 may be coupled to a power grid in one or more embodiments to provide electrical power to the device or to provide generated power from the device to the power grid, or combinations thereof. For example, a solar device or other electrical device may be coupled to the extruded frame structure 100 via the one or more couplers 108 such that an electrical connection between the device and the conductor 106 is conveniently made through the insulator 104. An electrical connection may be made between the device and the conductor 106, for example, in the top region of FIG. 1 where insulator 104 is exposed as depicted. Such an example electrical connection is depicted in connection with FIG. 2.

Figure 2:
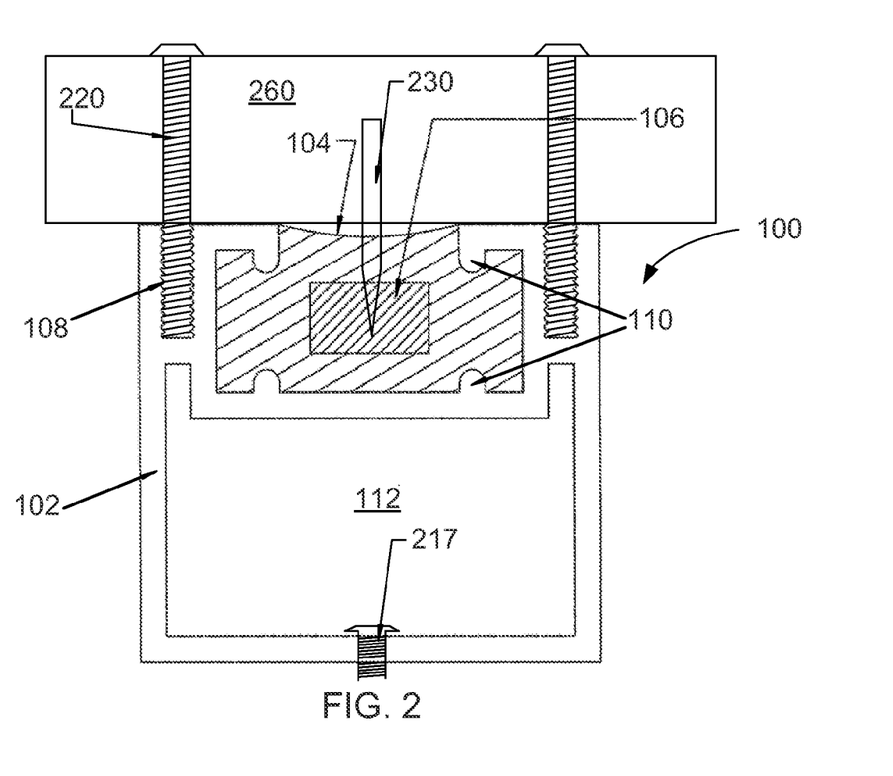
FIG. 2 is a cross-section schematic diagram of the extruded frame structure of FIG. 1 electrically coupled to a solar/electrical device, in accordance with various embodiments of the invention.

FIG. 2 is a cross-section schematic diagram of the extruded frame structure 100 of FIG. 1 electrically coupled to a solar/electrical device 260, in accordance with various embodiments of the invention. The solar/electrical device 260 is representative of any suitable type of electrical device that can benefit from principles and configurations described herein. In an embodiment, the solar/electrical device 260 is a solar panel comprising one or more solar cells to generate electrical power. The solar/electrical device 260 is coupled to the extruded frame structure 100 using one or more fasteners 220 (e.g., bolts) inserted into the one or more couplers 108.

The solar/electrical device 260 includes an electrically conductive protrusion 230 configured to form an electrical connection with the conductor 106 embedded in the extruded frame structure 100, as shown. For example, the electrically conductive protrusion 230 is electrically couple to the conductor 106 through the area where the insulator 104 is exposed in the frame profile 102. The electrically conductive protrusion 230 comprises an electrically conductive material such as a metal. The electrically conductive protrusion 230 can be, for example, a plug-type structure to couple with the conductor via one or more power inlets/outlets or other related structures formed in the insulator 104 and the conductor. In another embodiment, the electrically conductive protrusion 230 is sharp or otherwise configured to penetrate the insulator 104 and form an electrical connection with the conductor 106. Multiple electrically conductive protrusions (e.g., 230) can be used according to various embodiments.

One or more outlets or other related structures to electrically connect the conductor 106 with one or more solar/electrical devices (e.g., 260) may be disposed along a length (e.g., in and out of the page) of the conductor 106 to provide electrical access between the solar/electrical device 260 and the conductor 106, according to various embodiments. In other embodiments, no outlets are provided along the conductor 106 and the solar/electrical device 260 is electrically coupled to the conductor 106 using an electrically conductive protrusion 230 that is configured to penetrate the insulator 104 and access the conductor 106 when seated or coupled with frame structure 100, as illustrated. It is envisioned that physically connecting the solar/electrical device 260 to the extruded frame structure 100 (e.g., by bolts 220 in one or more couplers 108) and forming the electrical connection between the electrically conductive protrusion 230 and the conductor 106 can occur in a substantially simultaneous fashion, reducing time and costs associated with installing the solar/electrical device 260. Other techniques to electrically couple the solar/electrical device 260 with the conductor 106 may be used in other embodiments.

A connector 217 such as a bolt or other fastener can be used to couple structural features of the frame profile 102 that surround area 112 with, e.g., other structural elements. For example, the connector 217 can be a bolt used to fasten the extruded frame structure 100 to another frame structure.

Extruded frame structures (e.g., 100) as described herein may simultaneously provide structural support and convenient access to a conductor 106 for transfer of electrical energy for one or more electrical devices (e.g., solar electrical device 260), according to various embodiments. Extruded frame structures may further allow the elimination of cumbersome or unsightly wires or cables for the transfer of electrical energy in systems that utilize such frame structures and electrical energies. The conductor 106 may be safely disposed within the frame structure 100 to provide greater resilience to the elements, rodents, mishaps or other forces that more readily compromise conventional wires or cables that are not disposed within a more protective housing provided by the extruded frame structure 100.

Figure 3:
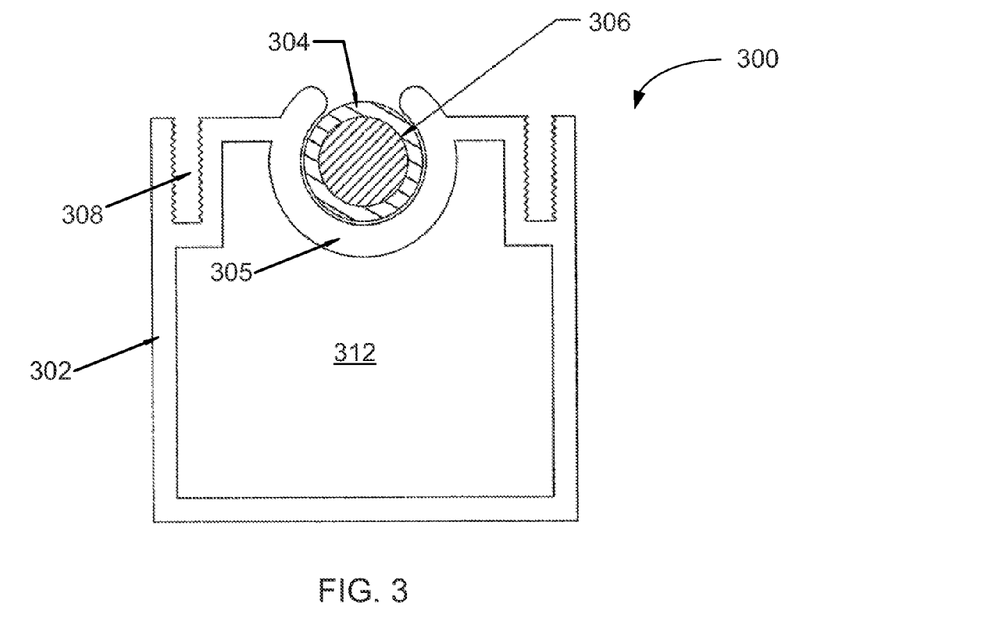
FIG. 3 is a cross-section schematic diagram of another extruded frame structure, in accordance with various embodiments of the invention.

FIG. 3 is a cross-section schematic diagram of another extruded frame structure 300, in accordance with various embodiments of the invention. In an embodiment, the extruded frame structure 300 includes a frame profile 302 to house an insulator 304 and conductor 306, as shown. The frame structure 300 may accord with embodiments already described with respect to FIG. 1 or described elsewhere herein. For example, the one or more recessed regions 308 and/or the area 312 may comport with embodiments described in connection with the one or more couplers 108 and the area 112 of FIG. 1.

The frame structure 300 depicts an example alternative shape of the frame profile 302, the insulator 304, and the conductor 306. In an embodiment, the frame structure 300 includes a circular housing 305 in the frame profile 302 for an insulator 304 having a circular cross-section shape and a conductor 306 having a circular cross-section shape. In other embodiments, the housing 305 is substantially rectangular in shape (e.g., region 107 of frame profile 102 in FIG. 1). Subject matter is not limited in this regard and may include other shapes and/or configurations in other embodiments.

In an embodiment, the conductor 306 is a wire. The conductor 306 may be extruded simultaneously with the frame profile 302 in accordance with techniques described herein, according to various embodiments. In other embodiments, the conductor 306 is fabricated separate from the frame profile 302 and then later configured in the extruded frame structure 300 as shown.

Figure 4:
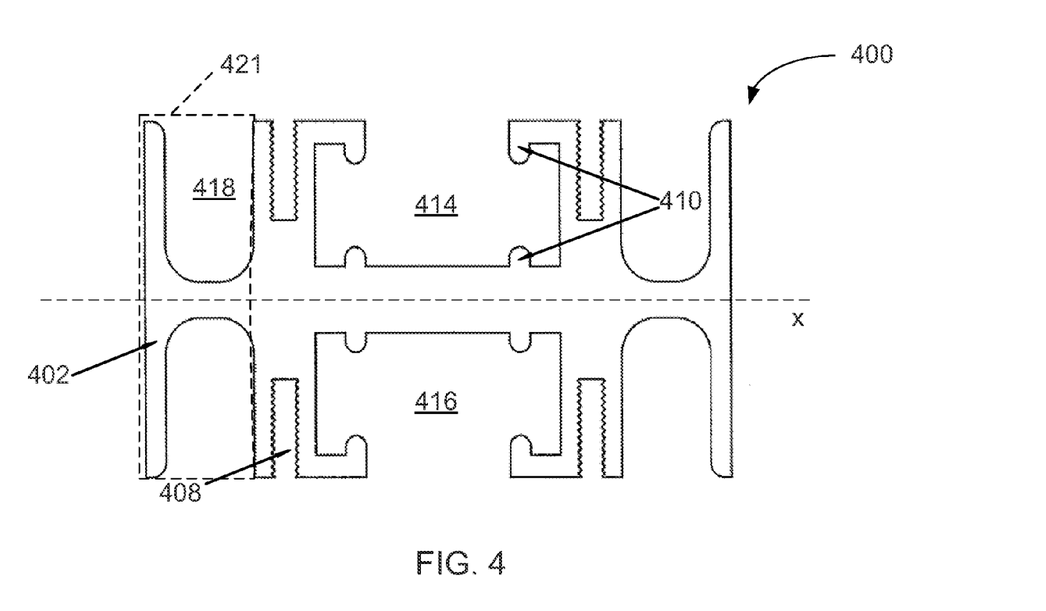
FIG. 4 is a cross-section schematic diagram of another extruded frame structure, in accordance with various embodiments of the invention.

FIG. 4 is a cross-section schematic diagram of another extruded frame structure 400, in accordance with various embodiments of the invention. In an embodiment, the extruded frame structure 400 includes a frame profile 402 having one or more recessed areas 408, grip structures 410, first region 414 and second region 416 formed by the frame profile 402 to house a conductor (not shown), and one or more additional areas 418 formed by the frame profile 402, coupled and configured as shown. According to various embodiments, the frame profile 402, the one or more first recessed areas 408, and the grip structures 410 comport with embodiments already described in connection with analogous features of the extruded frame structure 100 of FIG. 1.

The extruded frame structure 400 includes multiple regions (e.g., first region 414 and second region 416) of the frame profile 402 to house corresponding conductors and corresponding insulators. In an embodiment, the first region 414 and the second region 416 are arranged as shown, where the first region 414 for a conductor is disposed opposite to the second region 416 for a conductor, as shown. For example, the first area 414 may be substantially positioned as a mirror-image of the second area 416 across horizontal axis, x. That is, the openings in the frame profile 402 for region 414 and region 416 face substantially opposite directions.

The extruded frame structure 400 may further include one or more additional areas 418. The extruded frame structure 400 may further include one or more structures to provide structural support. For example, the frame profile 402 may include weight removal I-beam structures (e.g., within region 421) to provide additional strength in various embodiments. The extruded frame structure 400 may include more or less features than depicted, according to various embodiments.

Figure 5:
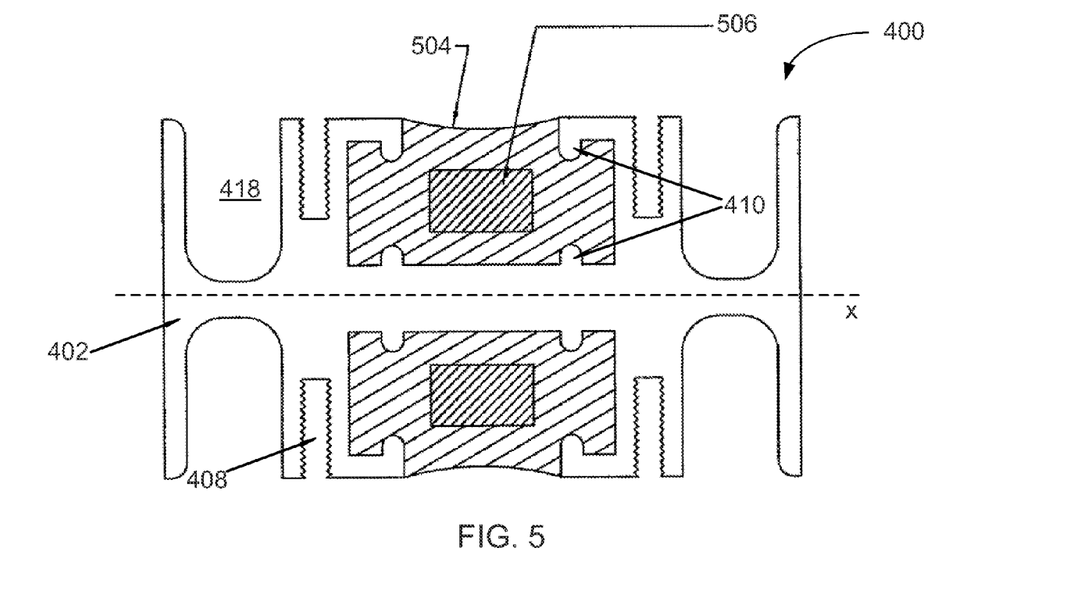
FIG. 5 is a cross-section schematic diagram of the extruded frame structure of FIG. 4 having an insulator and a conductor disposed therein, in accordance with various embodiments of the invention.

FIG. 5 is a cross-section schematic diagram of the extruded frame structure 400 of FIG. 4 having corresponding insulators 504 and conductors 506 disposed therein, in accordance with various embodiments of the invention. In an embodiment, the insulators 504 and conductors 506 are disposed within the first region 414 and the second region 416 of FIG. 4. According to various embodiments, the insulators 504, and the conductors 506 comport with embodiments already described in connection with the insulator 104 and conductor 106 of FIG. 1.

The multiple insulators 504 and conductors 506 can be configured in various arrangements. For example, combinations of arrangements as depicted or described in connection with FIGS. 1-7 are envisioned and fall within the scope of this disclosure.

Figure 6:
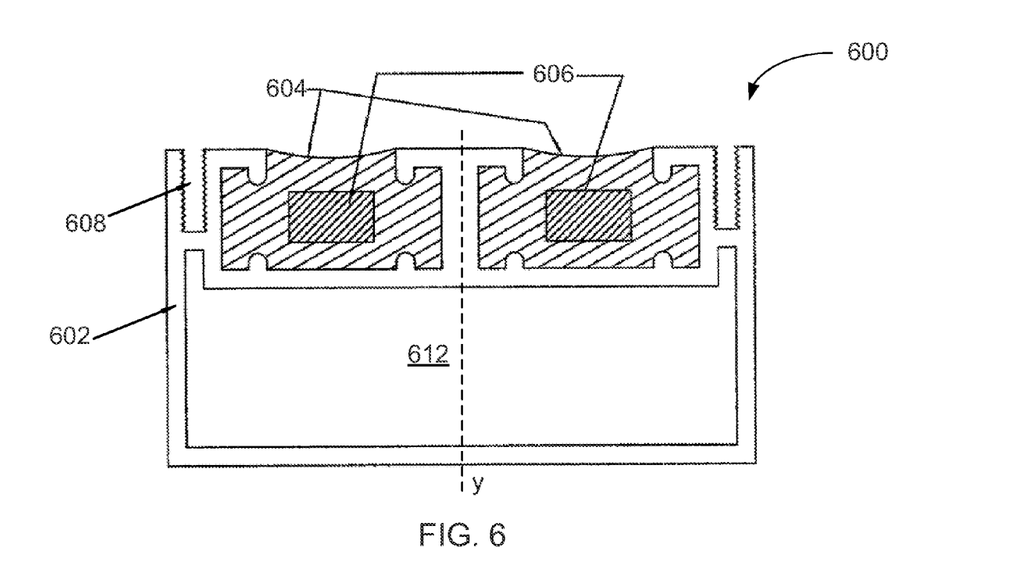
FIG. 6 is a cross-section schematic diagram of another extruded frame structure, in accordance with various embodiments of the invention.

FIG. 6 is a cross-section schematic diagram of another extruded frame structure 600, in accordance with various embodiments of the invention. In an embodiment, the extruded frame structure 600 includes frame profile 602, and multiple insulators 604 and conductors 606, arranged as shown. The frame profile 602, insulators 604, conductors 606, one or more recessed regions 608, and area 612 may comport with embodiments already described in connection with the frame profile 102, insulator 104, conductor 106, one or more couplers 108, and area 112 of FIG. 1.

In an embodiment, the insulators 604 and conductors 606 are arranged such that the frame profile 602 substantially forms a mirror-image across a vertical axis, y, as depicted. The insulators 604 and conductors 606 are configured in a side-by-side arrangement. That is, the openings in the frame profile 602 for the regions that house the insulators 604 and conductors 606 face substantially the same direction. The insulators 604 and conductors 606 may be arranged in a variety of other arrangements. For example, more or less insulators 604 and conductors 606 and/or other features than depicted may be included in other embodiments.

Figure 7:
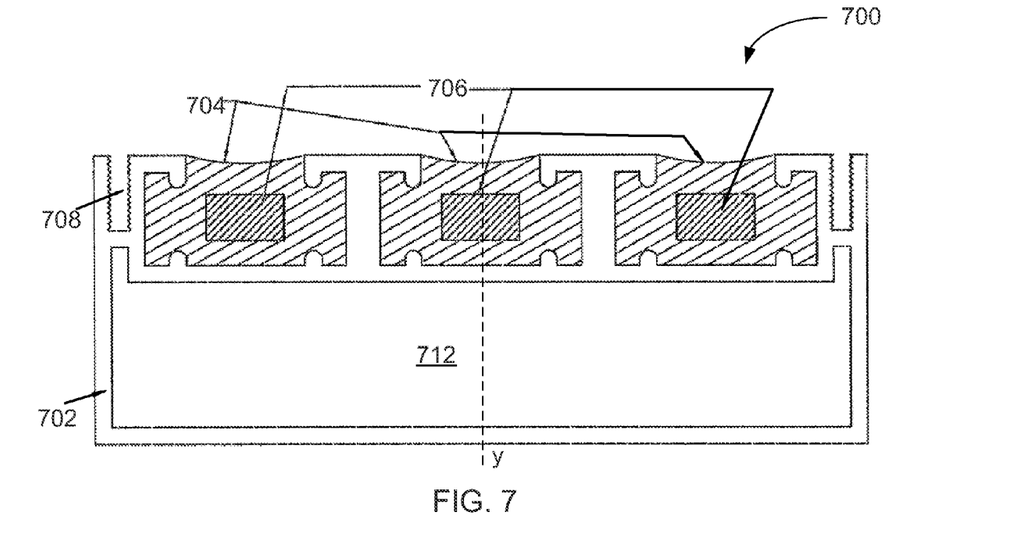
FIG. 7 is a cross-section schematic diagram of another extruded frame structure, in accordance with various embodiments of the invention.

FIG. 7 is a cross-section schematic diagram of another extruded frame structure 700, in accordance with various embodiments of the invention. In an embodiment, the extruded frame structure 700 includes frame profile 702, multiple insulators 704, and multiple conductors 706, coupled as shown. The frame profile 702, insulators 704, conductors 706, one or more recessed regions 708, and area 712 may comport with embodiments already described with respect to frame profile 102, insulator 104, conductor 106, one or more couplers 108, and area 112.

In an embodiment, the insulators 704 and conductors 706 are arranged such that the frame profile 702 substantially forms a mirror image across vertical axis, y, as depicted. More or less insulators 704 and conductors 706 and/or other features than depicted may be included in other embodiments.

Figure 8:
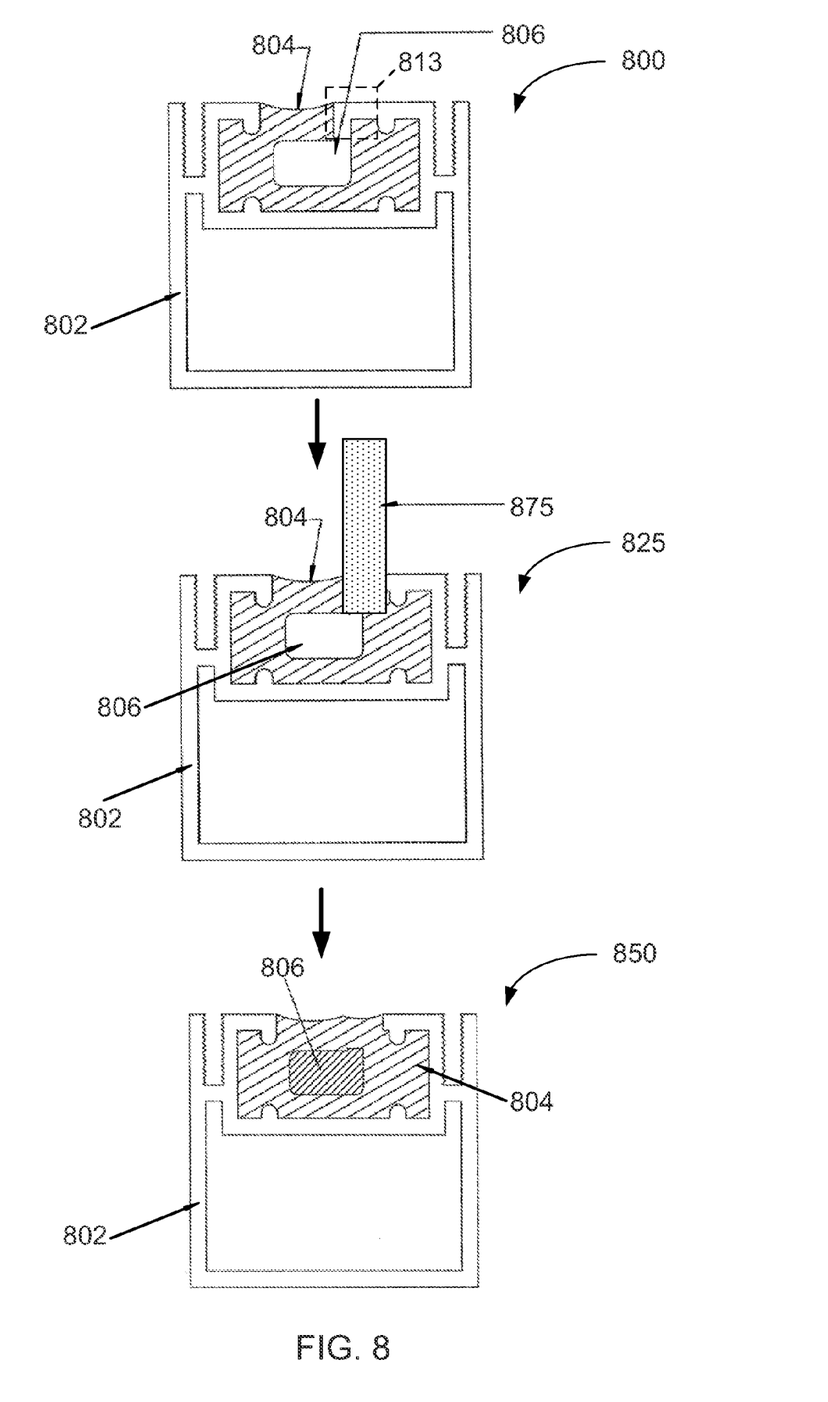
FIG. 8 is a cross-section schematic diagram of an extruded frame structure according to a fabrication process after various fabrication process actions, in accordance with various embodiments of the invention.

FIG. 8 is a cross-section schematic diagram of an extruded frame structure (e.g., 800, 825, and 850) according to a fabrication process after various fabrication process actions, in accordance with various embodiments of the invention. In an embodiment, a method to fabricate an extruded frame structure (e.g., 100 of FIG. 1) includes simultaneously extruding an extruded frame structure 800 and conductor 806 using a frame profile 802, and subsequently depositing an electrically insulative material to substantially fill a region between the extruded frame structure 800 and the conductor 806 to form an insulator 804, as depicted in connection with extruded frame structure 800. The method further includes cutting or otherwise removing extruded material that physically connects the conductor 806 with the extruded frame structure 800, as depicted in connection with extruded frame structure 825. The method further includes substantially filling the void made by removing the extruded material with an electrically insulative material to form the insulator 804, as depicted in connection with extruded frame structure 850.

The extruded frame structure 800 represents an extruded frame structure after simultaneously extruding the conductor 806 with the extruded frame structure 800 using frame profile 802 and after depositing an electrically insulative material to form the insulator 804. In an embodiment, the frame profile 802 includes a conductor 806 physically attached to the extruded frame structure 800 by extruded material (e.g., within region 813) as depicted. In other embodiments, the conductor 806 can be physically attached to the extruded frame structure in other suitable arrangements or configurations.

After simultaneous extrusion of the extruded frame structure 800 with the conductor 806, an electrically insulative material may be poured, injected, or otherwise deposited to substantially fill an area between the conductor 806 and the extruded frame structure 800, as depicted. For example, the electrically insulative material may be deposited to substantially fill the region (e.g., 107 of FIG. 1) of the frame profile 802 that is configured to house the conductor 806. The deposited electrically insulative material may be cured or otherwise hardened using any suitable technique.

The extruded frame structure 825 represents an extruded frame structure during removal of the extruded material that physically connects the conductor 806 with the extruded frame structure 800. In an embodiment, a debridge cutter 875 may be used to remove extruded material that physically connects the conductor 806 with the extruded frame structure 800 along a length (e.g., in and out of the page) of the extruded frame structure 825. The conductor 806 may be embedded and held in place by the hardened insulator 804 material structure during the removal process. In an embodiment, removing the extruded material electrically isolates the conductor 806 from the extruded frame structure 825. Subject matter is not limited in this regard, and other techniques to remove the extruded material may be used according to various other embodiments.

The extruded frame structure 850 represents an extruded frame structure after depositing additional electrically insulative material. For example, electrically insulative material may be deposited to substantially fill a void formed by removing the extruded material as depicted in the frame structure 825. In an embodiment, the void is filled to form the insulator 804. Filling the void may be performed by any suitable deposition method including, for example, pouring or injection molding. Other deposition methods may be used in other embodiments. In an embodiment, an insulative material used to backfill the void is the same insulative material used to originally fill the area between the conductor 806 and the extruded frame structure 800. In other embodiments, the insulative material used in the first deposition as described for the extruded frame structure 800 and the insulative material used in the second deposition as described for the extruded frame structure 850 are different.

The frame profile 802, conductor 806, and insulator 804, and other features of the extruded frame structure 850 may comport with embodiments already described with respect to analogous features described in connection with FIG. 1. According to various embodiments, the frame profile 802 may comport with other shapes, configurations and/or arrangements described herein.

Figure 9:
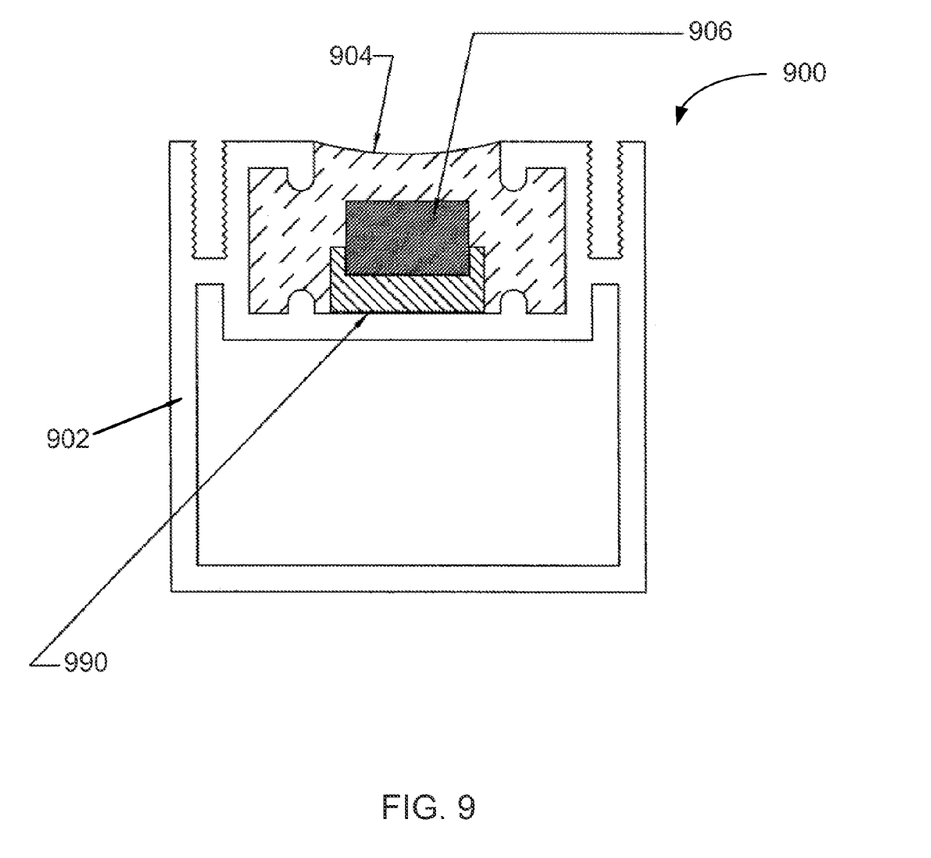
FIG. 9 is a cross-section schematic diagram of an extruded frame structure formed using another fabrication process, in accordance with various embodiments of the invention.

FIG. 9 is a cross-section schematic diagram of an extruded frame structure 900 formed using another fabrication process, in accordance with various embodiments of the invention. In an embodiment, the frame structure 900 is fabricated using a positioning structure 990 to support and/or position the conductor 906 within the region (e.g., 107 of FIG. 1) of the frame profile 902 housing the conductor 906.

In various embodiments, a method of fabrication of the frame structure 900 includes using a positioning structure 990 to hold the conductor 906 in place while electrically insulative material is deposited to substantially fill the unoccupied space between the conductor 906 and the extruded frame structure 900 (e.g., the region of the frame profile 902 housing the conductor). In an embodiment, the positioning structure 990 comprises an electrically insulative material to provide electrical insulation between the conductor 906 and the extruded frame structure 900. The positioning structure 990 may be the same or different type of material as the material deposited to form the insulator 904.

The positioning structure 990 can include a variety of different shapes and configurations to support the conductor 906 during a deposition of material to form the insulator 904. For example, the positioning structure 990 can include a base support having a rectangular cross-section profile, or other shapes that extend to more fully surround the conductor 906, as illustrated. The positioning structure 990 can further include features such as protrusions to provide a desired distance between the conductor 906 and the extruded frame structure 900. In an embodiment, the positioning structure 990 comprises a circular shape having protrusions to position the conductor 906 in a desired configuration relative to the extruded frame structure 900. The desired configuration of the conductor 906 relative to the extruded frame structure 900 may include a distance to provide electrical insulation between the conductor 906 and the extruded frame structure 900. The positioning structure 990 may have areas or voids to allow insulator 904 material to fill and better adhere to the positioning structure 990.

According to various embodiments, the positioning structure 990 may be a discrete structure placed at intervals along a length (e.g., in and out of the page) of the extruded frame structure 900 to support the conductor 906. In other embodiments, the positioning structure 990 may be a continuous structure that runs the length of the extruded frame structure 900 or the conductor 906 to support the conductor 906 during deposition of the insulator 904.

In one embodiment, the positioning structure 990 is positioned within the frame profile 902 to support a conductor 906 that is formed separately from the extruded frame structure 900. For example, the extruded frame structure 900 and the conductor 906 may be separately extruded, and, subsequently, the positioning structure 990 can be placed in the extruded frame structure 900 to receive the conductor 906 or coupled with the conductor 906 prior to placing the conductor 906 within the extruded frame structure 900. In another embodiment, the positioning structure 990 is positioned in the extruded frame structure 900 to support a conductor 906 that is formed simultaneously with the extruded frame structure 900 by extrusion. Such technique may include combinations of methods described in connection with FIGS. 8 and 9.

Figure 10:
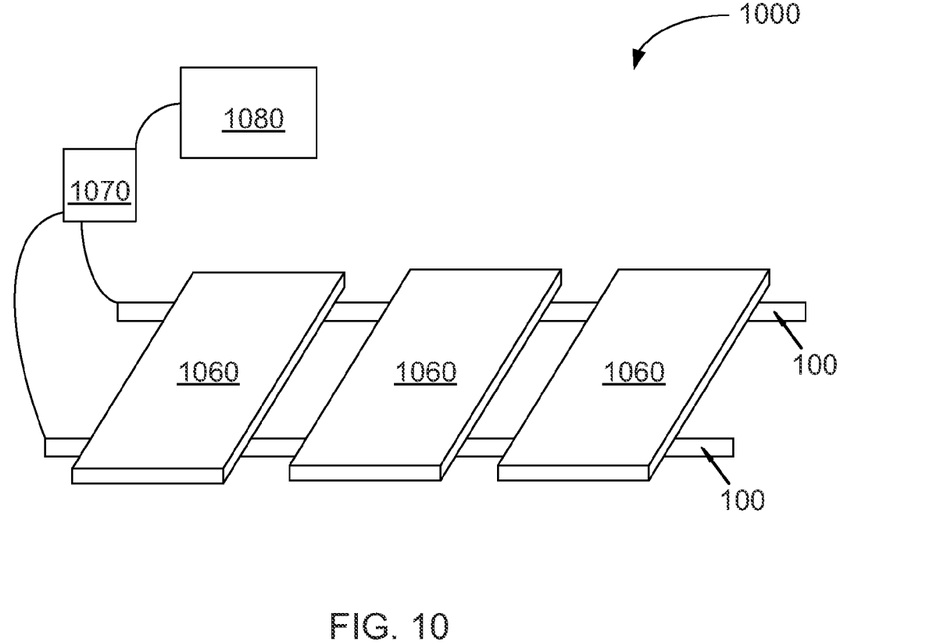
FIG. 10 illustrates an example system in which an extruded frame structure as described herein may be used, in accordance with various embodiments of the invention.

FIG. 10 illustrates an example system 1000 in which an extruded frame structure (e.g., 100) as described herein may be used, in accordance with various embodiments of the invention. In an embodiment, the system 900 includes one or more electrical devices 1060 (e.g., solar/electrical device 260 of FIG. 2) electrically and physically coupled with one or more extruded frame structures 100. The extruded frame structure(s) 100 may comport with a variety of embodiments described herein. The system 1000 may further include equipment 1070 to convert, transform, transfer, and/or condition electrical energies associated with the electrical devices 1060 and the extruded frame structure(s) 100 for use in a power grid 1080.

In an embodiment, the system 1000 comprises a solar energy system. The electrical devices 1060 may include solar panels having, for example, solar cells to generate electricity. Electricity generated by the solar cells may include direct current (DC), which may be converted, for example, to alternating current (AC) using the equipment 1070 (e.g., an inverter) coupled with the power grid 1080.

In one embodiment, the extruded frame structures 100 are arranged to provide structural support and electrical connectivity for the electrical devices 1060. The extruded frame structure(s) 100 include a conductor (e.g., 106 of FIG. 1) as described herein to electrically couple the electrical devices 1060 together, or with a power grid 1080, or another electrical device or equipment (not shown), or combinations thereof. Subject matter is not limited in this regard, and the system 1000 may include other systems that generate or use electricity, or combinations thereof.

The extruded frame structure(s) 100 as described herein may simultaneously provide structural support and convenient access to a conductor (e.g., 106 of FIG. 1) for transfer of electrical energy for the one or more electrical devices 1060, according to various embodiments. The extruded frame structure(s) 100 may further allow the elimination of cumbersome or unsightly wires or cables for the transfer of electrical energy. The conductor disposed within the extruded frame structure(s) 100 may further provide greater resilience to the elements, rodents, mishaps or other forces that more readily compromise conventional wires or cables that are not disposed within a protective housing as provided by the extruded frame structure(s) 100. The extruded frame structure(s) 100 may further facilitate simultaneous structural and electrical coupling of one or more electrical devices 1060 to the extruded frame structure(s) 100, according to embodiments described herein.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
an extruded frame structure having a frame profile;

a first region of the frame profile configured to substantially surround a first conductor disposed therein, said first conductor being at least partially disposed in a first insulator to electrically insulate the first conductor from the extruded frame structure, the first insulator being disposed in the first region of the frame profile except for an area where the first insulator is exposed;

one or more couplers in the frame profile to facilitate coupling of one or more electrical devices to the extruded frame structure, wherein the one or more couplers comprise one or more recessed regions, the one or more recessed regions being disposed in a surface of the frame profile adjacent to the area where the first insulator is exposed; and one of the one or more electrical devices coupled to the extruded frame structure using the one or more recessed regions, the one of the one or more electrical devices comprising an electrically conductive protrusion to form an electrical connection for the electrical device; wherein the electrically conductive protrusion is electrically coupled to the first conductor through the area where the first insulator is exposed.

2. The apparatus of claim 1, wherein the one of the one or more electrical devices is a solar panel.

3. The apparatus of claim 1, wherein the extruded frame structure comprises second or more regions of the frame profile to house corresponding second or more conductors and corresponding second or more insulators.

4. The apparatus of claim 1, wherein the first region of the frame profile is substantially rectangular or circular in shape; and wherein the first conductor is a buss bar or a wire.

5. The apparatus of claim 1, wherein: the extruded frame structure comprises aluminum; the first conductor comprises copper or aluminum; and the first insulator comprises at least one of diphenylmethane diisocyanate, ethylene glycol, diethylene glycol, di(ethylene glycol) phthalate, and polyurethane.

6. The apparatus of claim 1, wherein the frame profile has a hollow area void of extruded material adjacent to the first region of the frame profile.

7. The apparatus of claim 1, wherein the frame profile includes one or more grip structures disposed in the first region of the frame profile to facilitate holding the first insulator and the first conductor within the first region.

8. The apparatus of claim 1, further comprising: a positioning structure to facilitate positioning of the first conductor within the first region of the frame profile, the positioning structure comprising an electrically insulative material.

9. A system comprising:

one or more extruded frame structures arranged to structurally support and provide electrical connectivity for one or more electrical devices, wherein the one or more extruded frame structures each comprises:

a frame profile;

a first region of the frame profile housing a first conductor disposed in the first region of the frame profile;

a first insulator disposed in the first region of the frame profile to electrically insulate the first conductor from the one or more extruded frame structures; and one or more couplers disposed in a surface of the frame profile adjacent to the area where the first insulator is exposed, the one or more couplers to facilitate coupling of one or more electrical devices to the extruded frame structure; and wherein the first region of the frame profile is configured to substantially surround the first conductor and the first insulator except for an area where the first insulator is exposed; and wherein the one or more electrical devices being coupled to the one or more extruded frame structures using the one or more couplers, the one or more electrical devices comprising one or more electrically conductive protrusions to form an electrical connection for the one or more electrical devices; wherein the one or more electrically conductive protrusions are electrically coupled to the first conductor through the area where the first insulator is exposed.

10. The system of claim 9 further comprising: a piece of electrical equipment electrically coupled to the first conductor of the one or more extruded frame structures to convert, transform, transfer, or condition electrical energies from the one or more electrical devices for use in an electrical power grid: wherein the one or more electrical devices comprise one or more solar panels.

* * * * *